United States Patent

[11] 3,611,849

| [72] | Inventor | Joseph Domonkos |
| | | 1509 Grove Ave., Windber, Pa. 15963 |
| [21] | Appl. No. | 840,786 |
| [22] | Filed | July 10, 1969 |
| [45] | Patented | Oct. 12, 1971 |

[54] EATING UTENSIL FOR STRINGLIKE FOODS
3 Claims, 3 Drawing Figs.
[52] U.S. Cl................................................. 83/23,
83/13, 30/316
[51] Int. Cl.............................................. B26b 27/00
[50] Field of Search........................................ 83/13,
652–657, 23; D.95/701, 3; 30/301, 302, 316, 315;
145/25

[56] References Cited
UNITED STATES PATENTS

| 1,309,970 | 7/1919 | Taylor............................ | 83/654 |
| 1,642,390 | 9/1927 | Tekker.......................... | 30/315 |
| 2,257,202 | 9/1941 | Taylor........................... | 30/315 X |
| 1,653,994 | 12/1927 | Emmet.......................... | 30/316 |
| 2,359,584 | 10/1944 | Roehner....................... | 30/301 UX |
| 2,557,191 | 6/1951 | King.............................. | 30/316 |
| 2,823,716 | 2/1958 | Gelder.......................... | 30/316 X |
| 2,944,552 | 7/1960 | Cannon........................ | 30/316 X |

FOREIGN PATENTS

| 442,425 | 4/1927 | Germany...................... | 83/654 |

Primary Examiner—James M. Meister
Attorney—Thomas E. Sterling

ABSTRACT: A spaghetti knife comprised of a handle, a hollow oval cutting element attached to said handle, and a cutting edge positioned on the portion of the cutting element. The spaghetti knife is used in conjunction with a conventional fork for the eating of spaghetti or other stringlike foods. The knife is held over a plate of spaghetti, the fork placed through the hollow cutting element into the spaghetti and twisted in the usual manner. The spaghetti rolled onto the twisted fork is limited in diameter by the diameter of the cutting element and formed into a neat circular roll, which may be easily inserted into the mouth. When this roll of spaghetti is the appropriate size, the spaghetti knife is pressed downward against the plate upon which the spaghetti is resting, thus cutting the extraneous strings of spaghetti and forming a cylindrical roll of spaghetti. The fork is then withdrawn from the cutting element together with the roll of spaghetti and inserted in the mouth.

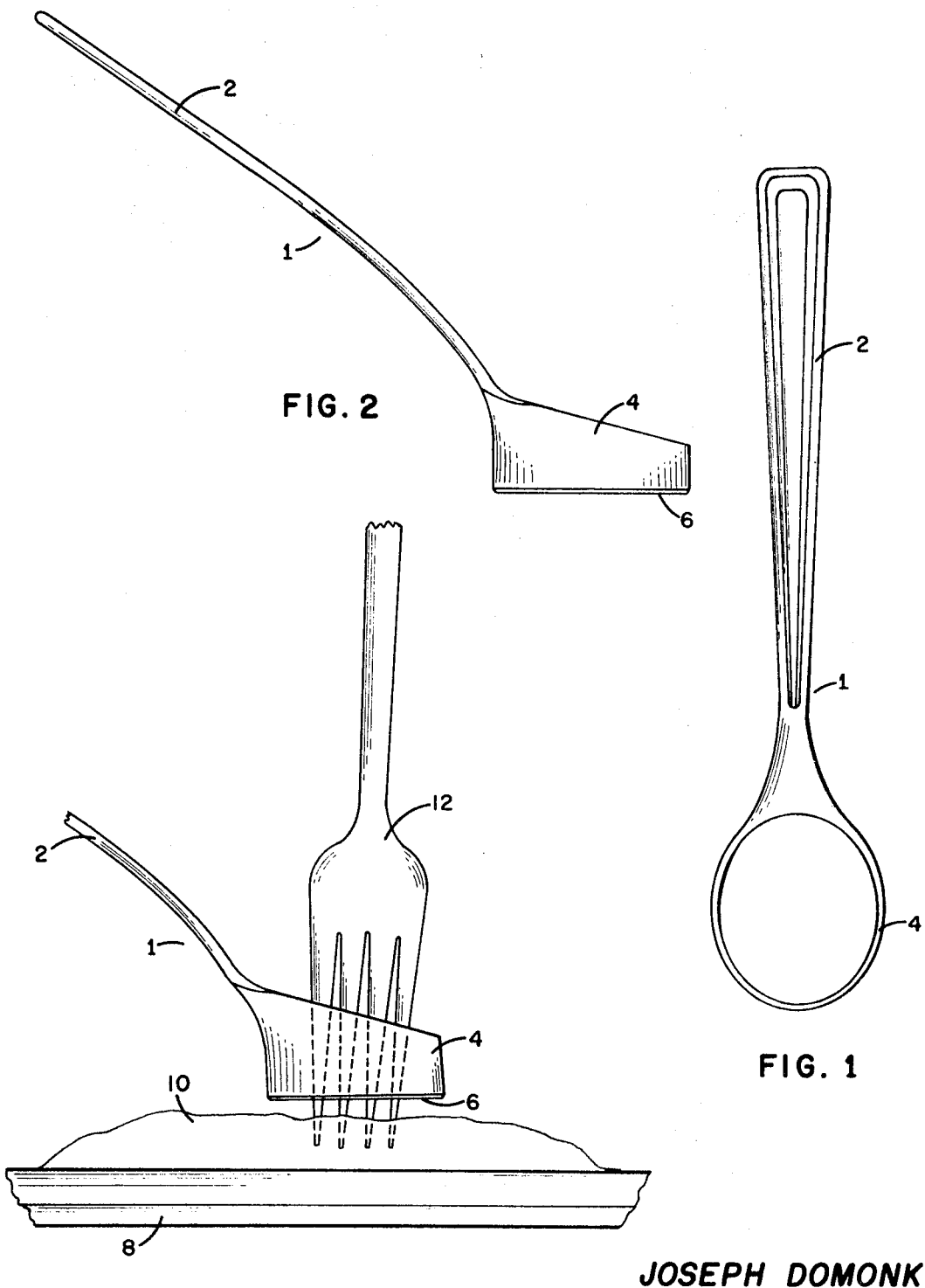

EATING UTENSIL FOR STRINGLIKE FOODS

Spaghetti, macaroni and other stringlike foods can be embarrassing and messy to consume, in that loose and uncontrolled ends are frequently left dangling while the fork containing the spaghetti is conveyed from the plate to the mouth.

It is an object of this invention to provide an eating utensil which will form the spaghetti, rotating on a conventional fork, to a bite-sized amount.

It is another object of this invention to provide an eating utensil having a cutting edge which will permit the cutting of the loose ends of the spaghetti in a convenient manner.

It is still another object of this invention to provide a spaghetti knife which will permit the transfer of rolled spaghetti from the plate to the mouth without danger of soiling the clothes.

These, and other objects of this invention, may be seen by referring to the drawings, specifications and claims hereinafter.

In the drawings, wherein like reference characters indicate like parts:

FIG. 1 is a top elevational view of the eating utensil;

FIG. 2 is a side view of the eating utensil; and

FIG. 3 is a side view of the eating utensil positioned above a plate of spaghetti and having a conventional fork inserted therethrough.

Referring to the drawings, and in particular to FIG. 1, the eating utensil or spaghetti knife 1 shown, is comprised of a handle, 2, on the end portion of which is mounted an oval-shaped cylindrical cutting element 4. The lower portion of this cutting element is flat and has a blunt cutting edge 6 ground thereon. The knife 1 may be made of stainless steel, plastic, or other materials. It must be constructed strong enough to withstand normal pressure when performing its function.

Referring now to FIG. 3, in operation, the spaghetti knife 1 is held by handle 2, usually with the left hand. The knife 1 is positioned over a plate 8 containing spaghetti 10 with cutting edge 6 approximately parallel to the bottom of plate 8. A conventional eating fork 12 is then inserted through the hollow oval portion of cutting element 4 and into the spaghetti 10 and is rotated, thus winding the strings of spaghetti about the prongs of the fork 12. The cutting element 4 is then lowered into the spaghetti 10 to form the spaghetti rolled about the fork 12 into the approximate size and shape of the internal diameter of the oval cutting element 4. This internal diameter of the cutting element 4, of course, is such that the roll of spaghetti is made bite size or will easily fit into the mouth.

When a roll of spaghetti about the fork 12 is of sufficient size, the cutting element 4 is pressed against the bottom of the plate 8 thus cutting the loose and unwanted ends of the spaghetti being rolled. Fork 12 is then withdrawn from cutting element 4 with an approximately cylindrical roll of spaghetti, thereon, which is bite size and has no loose or dangling ends. The fork containing the rolled spaghetti thereon is then transferred to the mouth where the spaghetti is removed and the fork is then reinserted in the hollow oval portion of cutting element 4 to repeat the process. As may be seen, the utilization of this spaghetti knife permits the easy, controlled eating of spaghetti without danger of soiling the clothes.

In the construction of this spaghetti knife, the hollow cutting element 4 may be made circular, oval, rectangular, square, or other shapes without departing from the spirit and function of the invention. Likewise, cutting edge 6 may be dispensed with in that the soft spaghetti or other foods may be cut by a blunt edge as well.

While a single modification of this invention has been illustrated and described, it is to be understood that the invention is not limited thereto. Various changes in the construction and arrangement may be made without departing from the spirit of the invention, as will be apparent to those skilled in the art.

What is claimed is:

1. A process utilizing a spaghetti knife having a handle, a hollow cutting element attached to said handle, and a conventional fork, comprising in combination the steps of:
   1. positioning said cutting element above spaghetti;
   2. inserting a fork through said cutting element into said spaghetti;
   3. lowering said cutting edge so as to form the wrapped spaghetti through the internal diameter thereof;
   4. rotating said fork within such spaghetti so as to wrap the spaghetti about said fork;
   5. cutting the loose spaghetti with said cutting edge by pressing said cutting edge against the surface of the container of spaghetti;

whereby a cylindrically formed stringless quantity of spaghetti is positioned on said fork ready to be inserted in the mouth.

2. An eating device used in shaping and cutting stringlike foods, adapted for use with a table fork, comprising in combination:
   a hollow, oval-shaped, cylindrical cutting element, said element having cylindrical sides of constant diameter;
   an edged surface extending along the end portion of said cutting element;
   a handle attached to said cutting element and extending therefrom at an acute angle, throughout the entire length of said handle; and
   a crevice-free surface area upon said cutting element and said handle facilitating easy cleaning of aid device.

3. The combination as claimed in claim 1 having a new step (6), following step (5) as follows:
   6. Removing said fork and spaghetti thereon from said cutting element, and transferring said fork and spaghetti into the mouth.